United States Patent [19]

Van Doorselaer

[11] 4,130,429

[45] Dec. 19, 1978

[54] COMBINATION OF PHOTOSENSITIVE ELEMENTS SUITED FOR USE IN RADIOGRAPHY

[75] Inventor: Marcel K. Van Doorselaer, 's-Gravenwezel, Belgium

[73] Assignee: AGFA-GEVAERT, N.V., Mortsel, Belgium

[21] Appl. No.: 624,258

[22] Filed: Oct. 20, 1975

Related U.S. Application Data

[63] Continuation-in-part of Ser. No. 303,386, Nov. 3, 1972, abandoned.

[51] Int. Cl.$^2$ ............................................. G03C 1/92
[52] U.S. Cl. .................................... 96/82; 96/45.1; 250/320; 250/475; 250/482; 250/483; 250/484; 250/486
[58] Field of Search ............ 96/45.1, 82, 84, 94; 250/320, 458, 475, 482, 483, 484, 486

[56] References Cited

U.S. PATENT DOCUMENTS

| | | | |
|---|---|---|---|
| T882,014 | 1/1971 | Rees et al. | 96/82 |
| 3,300,311 | 1/1967 | Kennard et al. | 96/82 |
| 3,418,247 | 12/1968 | Yocum et al. | 252/301.4 |
| 3,546,128 | 12/1970 | Rabatin | 252/301.4 |
| 3,617,285 | 11/1971 | Staudenmayer | 96/82 |
| 3,712,827 | 1/1973 | Gramza | 96/82 |
| 3,734,735 | 5/1973 | Bories | 96/82 |
| 3,737,313 | 6/1973 | Rosecrants et al. | 96/45.1 X |
| 3,753,714 | 8/1973 | Sugiyama et al. | 96/82 X |
| 3,822,131 | 7/1974 | Cleare | 96/82 |
| 3,883,747 | 5/1975 | Murashige et al. | 250/483 |
| 3,912,933 | 10/1975 | Van Stapper | 96/82 X |
| 3,945,822 | 3/1976 | Verhille | 96/1 R |

*Primary Examiner*—Edward C. Kimlin
*Attorney, Agent, or Firm*—A. W. Breiner

[57] ABSTRACT

A combination suitable for radiography comprising an x-ray fluorescent screen and a photosensitive silver halide recording material. The x-ray screen has more than half of its special emission above 410 nm, with its emission maximum in the wavelength range of 480 to 600 nm. The light absorption spectrum of the silver halide material corresponds with the light emission spectrum of the x-ray screen.

30 Claims, No Drawings

COMBINATION OF PHOTOSENSITIVE ELEMENTS SUITED FOR USE IN RADIOGRAPHY

This application is a continuation-in-part of copending application Ser. No. 303,386 filed Nov. 3, 1972, now abandoned.

The present invention relates to an improved combination of photosensitive elements suited for use in radiography and more particularly to a combination comprising an X-ray intensifying screen of the fluorescent type and a silver halide recording element.

By the term "radiography" we designate a recording technique that makes use of penetrating radiation which includes highly energetic radiation such as X-rays, β-rays, γ-rays, and fast electrons, e.g. as obtained in an electron microscope.

It is known that the use of fluorescent screens in combination with silver halide emulsion materials has resulted in a reduction of the radiation dose and offers an X-ray recording system of high speed. A disadvantage, however, of the use of fluorescent screens when compared with direct X-ray recording is the reduced image sharpness especially when silver halide materials are used having on both sides of a support that is transparent for fluorescent light, a silver halide emulsion layer, each of which during the X-ray exposure stands in close contact with a fluorescent screen.

Indeed, the light emitted by one of these fluorescent screens gives rise not only to an image-wise blackening in the adjacent silver halide emulsion layer, but penetrates also in a considerable amount through the support and produces an unsharp image in the oppositely situated silver halide emulsion layer. This phenomenon is called "cross-over." The degree of cross-over substantially determines the image quality of the image obtained in the radiographic recording material.

The cross-over causes unsharpness because of the diffusion in all directions of light in the different layers and support sheet of the silver halide recording material and also because of the refraction and diffuse reflection of light taking place at the boundaries of said layers and support sheet.

It has been proposed in the United Kingdom Patent Specification No. 821,352 to reduce the influence of the cross-over by incorporating filtering dyes in the film support and/or the substrate layers or intermediate layers of the film. The colouring obtained with these dyes is complementary to the colour of the fluorescent light of the particular intensifying screen used.

In practice this has been realized by using a blue-fluorescing calcium tungstate intensifying screen and a silver halide material containing in its support a yellow dye.

Calcium tungstate screens have been used from the year 1897.

Fluorescent screens on the basis of other phosphors have been described rather recently e.g. in the published German Patent Application (DT-OS) No. 2,051,262. These phosphors possess the characteristic of having a substantial part that is more than half of their spectral emission at less than about 410 nm, so that they may be considered as mainly ultra-violet light emitting. An example of such phosphor described also in the U.S. Pat. No. 3,737,313 is europium activated $BaSrSO_4$. In the same document as phosphor exhibiting a desirable luminescence with a negligible after glow has been mentioned terbium-activated lanthanum oxysulphide whose green emission makes it particularly suitable for fluoroscopic and radiographic application.

Image-unsharpness is not a phenomenon solely associated with cross-over but results also from diffuse emission, i.e. emission in all directions of the fluorescent light in the bulk material of the fluorescent layer and in the diffuse reflection at the support of the screen. Indeed, only the fluorescent light rays that are impinging substantially normally to the silver halide emulsion material offer a sharp image. Therefore, it is necessary to attenuate the non-normally emitted or reflected fluorescent radiation already in the screen material. Of course this will proceed at the expense also of the strength of the normally directed light, but since the oblique radiation covers a larger path in the screen material than the normally emitted or reflected radiation attenuation by absorption in the screen material will have a substantially larger influence on the oblique radiation.

Taking into account the preceding, it is self-explanatory that by increasing the thickness of a same screen composition the image will become unsharper. In connection herewith has to be noticed, however, that relatively thick screens provide a more homogeneous X-ray absorption. So, it would be advantageous to operate with fluorescent intensifying screens which have a relatively high thickness and in which the obliquely directed radiation is substantially reduced.

It is an object of this invention to provide a novel radiographic combination of a fluorescent screen and a silver halide photosensitive element capable of yielding a visible image with improved resolution at high speed.

Other objects and advantages of this invention will become apparent from an examination of the following description and example.

In accordance with the present invention these objects are attained with a combination of photosensitive elements suited for radiography and comprising:

(1) at least one X-ray fluorescent screen material having more than half its spectral emission above about 410 nm and having its emission maximum in the wavelength range of 480 to 600 nm and having a coverage of 250 to 600 g per sq.m of fluorescent substance(s) in a fluorescent layer having a thickness in the range of 70 to 250 μm, the intensification factor of the screen being at least 20 at 40 kV and at least 25 at 80 kV, said screen material containing a dye or pigment or a mixture of dyes and/or pigments absorbing light within the emission spectrum of the fluorescent substance(s);

(2) a photosensitive silver halide recording material comprising a support and incorporating at least one silver halide emulsion layer, and wherein the combined absorption of the support and of the layers at one side of the support is such that (i) the light absorption spectrum thereof mainly (at least for 50%) corresponds with the light emission spectrum of the fluorescent screen material in the wavelength range of 360 to 600 nm and (ii) the said combined absorption is such that in the range of overlap of said absorption and emission spectrum the optical density resulting therefrom comprises values in the range of 0.6 to 1.3 due to the inherent absorption of the silver halide emulsion layer(s) and the presence of a colouring substance(s) in one or more layers including the support and the silver halide emulsion layer(s) wherein silver halide grains are present that have been spectrally sensitized for visible light situated in the wavelength range of 480 to 600 nm.

By "intensification factor" is to be understood a factor measured at a pre-elected density D (in the present case it is density 1), indicating the exposure required to produce this density when the film is exposed to X-rays without screens, divided by the exposure required to produce the same density with the screens exposing the spectrally sensitized silver halide film with their fluorescent light.

In the radiographic combination of X-ray fluorescent screens and spectrally sensitized radiographic materials of the present invention, the said screens may be arranged separately from the radiation-sensitive silver halide material or it may form with the silver halide emulsion an integral arrangement so that on one and the same support both the silver halide emulsion and the X-ray fluorescent screen are provided. The radiographic material may be a single- or double-coated radiographic material, which means that the radiographic material comprises either at only one side or at both sides of the support a radiation sensitive silver halide emulsion. The fluorescent screens may be provided at both sides of a single- or double-coated radiographic material. The radiographic combination of fluorescent screens and radiographic materials may further comprise the common intermediate and/or protective and/or stripping layers, which may be arranged between or over the radiation-sensitive emulsions and the fluorescent screens.

The phosphors or fluorescing substances used in the visible light-emitting fluorescent screens applied in the present invention are e.g. fluorescent substances containing elements with atomic number 39 or 57 to 71, which include yttrium, gadolinium, lanthanum, cerium, etc. Particularly suitable are the rare earth oxysulphide and oxyhalide fluorescing materials activated with other selected rare earths e.g. lanthanum and gadolinium oxybromide and oxychloride activated with terbium or dysprosium, and lanthanum and gadolinium oxysulphides activated with terbium, europium, or a mixture of europium and samarium. These rare earth fluorescent materials have been extensively described in the recent literature for which we refer e.g. to German Patent Specification No. 1,282,819, French Patent Specifications Nos. 1,540,341-1,580,544 and 2,021,397, French Patent of Addition Nos. 94,579 to 1,473,531, United States Pat. No. 3,546,128 and to K. A. Wickersheim et al. "Rare Earth Oxysulphide X-ray Phosphors," in the proceedings of the IEEE Nuclear Science Symposium, San Francisco, Oct. 29-31, 1969 and to S. P. Wang et al. IEEE Transactions on Nuclear Science, February 1970, pages 49-56, and to R. A. Buchanan IEEE Transactions on Nuclear Science, February 1972, pages 81-83. These novels rare earth photoluminescent materials especially the gadolinium and lanthanum oxysulphides and oxyhalides activated with other selected rare earths e.g. erbium, terbium and dysprosium or with terbium and dysprosium have a high X-ray "stopping power" or average absorption and high emission density and enable radiologists to use substantially lower X-ray dosage levels.

Practically suited phosphors for use in the fluorescent intensification screens applied in the present invention correspond to the following general formula:

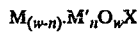

wherein:

M is at least one of the metals yttrium, lanthanum, gadolinium or lutetium,

M' is at least one of the rare earth metals dysprosium, erbium, europium, holmium, neodymium, praseodymium, samarium, terbium, thulium or ytterbium, X is sulphur or halogen, n is 0.0002 to 0.2, and w is 1 when X is halogen or is 2 when X is sulphur.

The preparation of fluorescent substances falling within the scope of that general formula has been described, e.g., in the French Patent Specification No. 1,580,544, in the U.S. Pat. Nos. 3,418,246 and 3,418,247 and in the United Kingdom Patent Specification No. 1,247,602.

A fluorescent screen containing a mixture of (A) yttrium oxysulphide activated with from 0.1 to 10% by weight of terbium or activated with terbium and dysprosium, and (B) gadolinium or lanthanum or lutetium oxysulphide activated with terbium or dysprosium is particularly useful for its high visible light emission capacity. A preferred ratio by weight of (A) and (B) is 25:75.

In combination with silver halide emulsion layers that are spectrally sensitized in the wavelength range of 450–570 nm preferably terbium-activated gadolinium or lanthanum oxysulphides having emission peaks at 490 and 540 nm and falling within the scope of the above general formula are used.

Other suitable intensification screens containing fluorescent materials that emit green (500–600 nm) light when exposed to cathode rays and X-ray radiations are described in United Kingdom Patent Specification No. 1,248,968.

By using a plurality of fluorescent screen layers of different composition or by using a fluorescent screen containing a mixture of different fluorescent substances of the above general formula a fluorescence over the whole visible spectrum can be obtained, so that such combination is particularly useful for recording with silver halide recording elements that have been made spectrally sensitive for light of the whole visible spectrum.

The selected fluorescent substance(s) is (are) in the form of a layer applied to a support or applied as a self-supporting layer or sheet. Particularly suited fluorescent layers or sheets have a thickness of preferably 90 to 225 μm and contain the fluorescent substance(s) or phosphors dispersed in a binder. Such binder is, e.g. an organic high molecular weight polymer. Preferred binding agents are, e.g., cellulose nitrate, ethylcellulose, cellulose acetate, polyvinyl acetate, polystyrene, polyvinylbutyral, polymethylmethacrylate and the like.

The proportion of high molecular weight polymer to fluorescent material is in general within the range of 5–15% by weight. A preferred grain size of the fluorescent substances is in the range of about 1 to 20 μm.

The surface of the fluorescent material layer may be protected against moisture and mechanical damage by a coating of an organic high polymer applied to a thickness of 0.001 to 0.05 mm. Such protecting coating is, e.g., a thin film of cellulose nitrate, cellulose acetate, polymethyl methacrylate and the like.

Besides the fluorescent light impinging normally to the silver halide containing layer there is always an amount of diffuse radiation in the fluorescent screen giving rise to image unsharpness. The image sharpness is improved considerably by incorporating a fluorescent light-absorbing dye called here "screening dye" into the fluorescent screen material e.g. in the fluorescent layer or into an adjacent layer thereto, e.g. a covering layer or subjacent antihalation layer. As the diffused oblique radiation covers a larger path in the screen material it is attenuated by the screening dye to a greater extent than the radiation impinging normally. The term "screening dye" includes here dyestuffs i.e. coloured substances in molecularly divided form as well as pigments.

Diffuse radiation reflecting from the support of the fluorescent screen material is mainly attenuated in an antihalation layer containing the screening dyes subjacent to the fluorescent layer.

The use of screening dyes in a covering layer to the fluorescent layer mainly reduces the strength of the obliquely emitted light originating from the fluorescent layer.

An appropriate screening dye for use in the fluorescent screens emitting in the green part (500–600 nm) of the visible spectrum is, e.g., Neozapon Fire Red (C.I. Solvent Red 119), an azochromium rhodamine complex. Other suitable screening dyes are: C.I. Solvent Red 8, 25, 30, 31, 32, 35, 71, 98, 99, 100, 102, 109, 110, 118, 124 and 130.

The screening dye has not to be removed from the fluorescent screen material and therefor may be any dye or pigment absorbing in the emission spectrum of the fluorescent substance(s). Thus a black substance such as carbon black incorporated in the antihalation layer of the screen material yields quite satisfactory results.

The screening dye(s) is (are) preferably used in the antihalation layer in an amount of at least 0.5 mg per sq.m. Their amount in the anti-halation layer is not limited.

Very good results are obtained with the screening dye(s) in the antihalation layer and in the layer containing the fluorescent substances. In that case the fluorescent layer contains e.g. the screening dye or dyes in an amount of 5 mg per sq.m. The amount of screening dye(s) in the fluorescent layer and/or covering layer may be adapted to the results of image sharpness and intensity of emitted radiation aimed at.

The radiographic combinations of our invention employ in addition to the fluorescent screen an element comprising a suitable support bearing a properly spectrally sensitized silver halide. Said silver halide may be present in a layer or coating such as a single coating or a duplitized or dual coating, i.e. in a material having a silver halide emulsion layer on each side of a support. Suitable supports are those having the properties to permit their ready passage through a rapid automatic processor. The support should therefore be reasonably flexible and preferably transparent but able to maintain the dimensional stability and integrity of the various coatings thereon. Typical film supports are cellulose nitrate, cellulose ester, polyvinyl acetal, polystyrene, polyethylene terephthalate, and the like. Supports such as cards or paper that are coated with $\alpha$-olefin polymers, particularly polymers of $\alpha$-olefins containing two or more carbon atoms, as exemplified by polyethylene, polypropylene, ethylene-butene copolymers and the like, give good results.

The dyes used in the silver halide emulsion recording material called hereinafter "filtering dyes" are preferably incorporated in a hydrophilic colloid layer between the silver halide emulsion layers or in the emulsion layers themselves. They may, however, likewise be incorporated in one or more subbing layers in an antihalation layer at either side of the support and even in the support, e.g. giving it a blue aspect offering it a specular absorption density reaching e.g. up to 0.45 in the 480 to 700 nm wavelength range. The dyes have, however, preferably such chemical and/or physical characteristics that they can be removed or decolourized in one of the processing baths.

According to a preferred embodiment of the present invention a filtering dye or mixture of filtering dyes absorbing in the wavelength range of about 480 to 600 nm is used when fluorescent screens are applied that emit mainly green light (480–600 nm).

The amount of filtering dye is preferably in the range of 25 to 1000 mg per sq.m but here likewise lower or higher amounts may be appropriate according to the result aimed at.

Suitable filtering dyes that can be removed from hydrophilic colloid layers are e.g. those listed in table 1.

Table 1

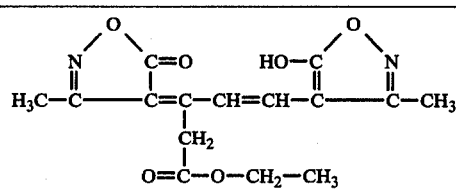

1.

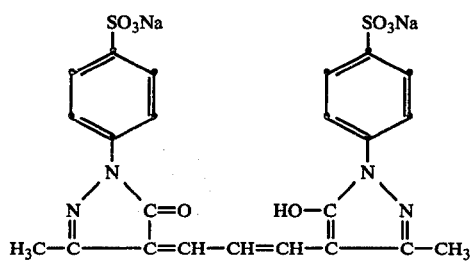

2.

Table 1-continued
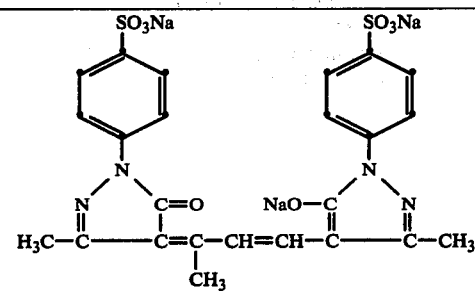 3.
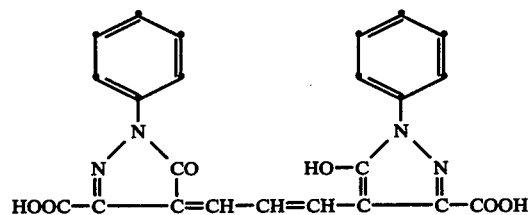 4.
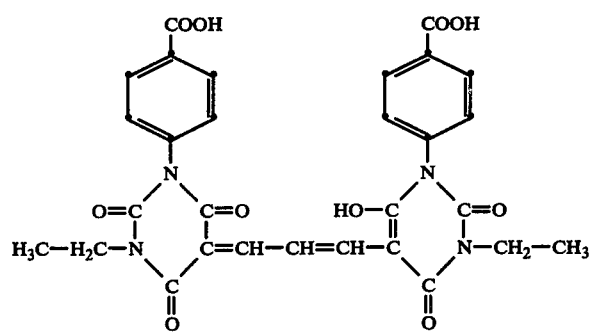 5.
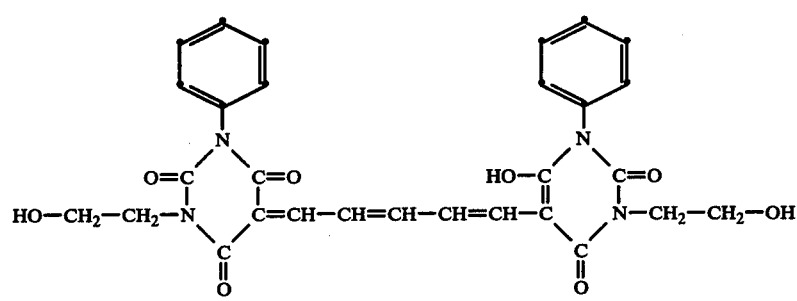 6.
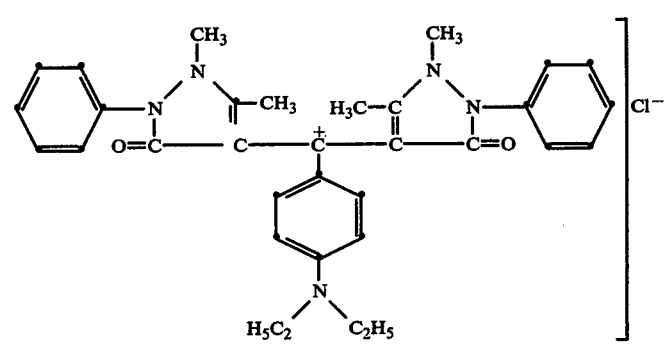 7.
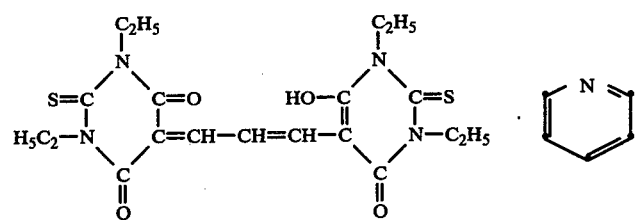 8.

Table 1-continued

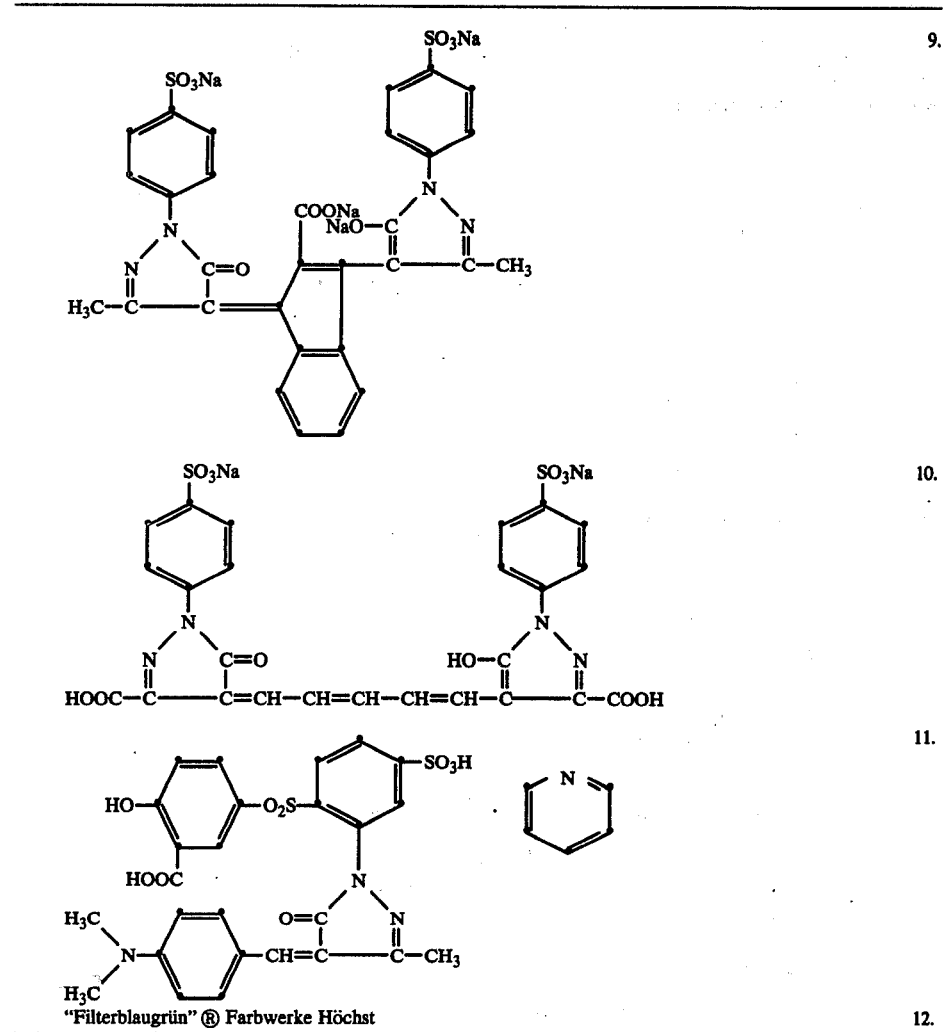

"Filterblaugrün" ® Farbwerke Höchst

In the radiographic combination of X-ray fluorescent screens and spectrally sensitized silver halide radiographic materials of the present invention, the screens may be arranged separately from the radiation-sensitive silver halide material or they may form with the silver halide emulsion an integral arrangement so that on one and the same support both a silver halide emulsion and an X-ray fluorescent screen are provided.

The emulsions may be spectrally sensitized by any of the known procedures. They may be spectrally sensitized by means of common spectrally sensitizing dyes used in silver halide emulsions, which include cyanine dyes and merocyanine dyes as well as other dyes as described by F. M. Hamer in "The Cyanine Dyes and related Compounds," Interscience Publishers (1964). These dyes are preferably used in an amount in the range of 20 mg to 250 mg per mole of silver halide.

Suitable spectral sensitizing dyes for silver halide to be used in the combination with screens emitting light in the wavelength range of 480–600 nm are listed for illustrative purposes in the following table 2.

Table 2

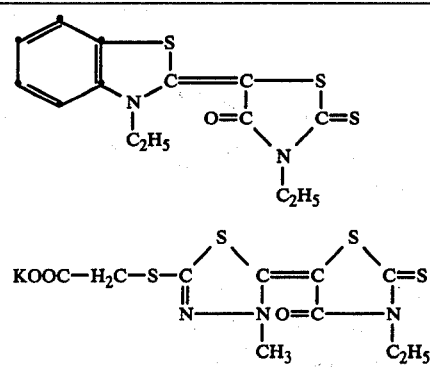

Table 2-continued
3. 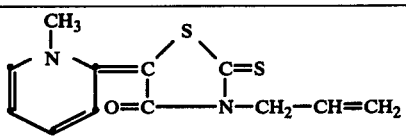
4. 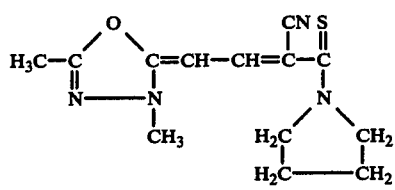
5. 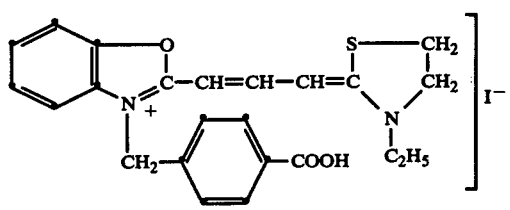
6. 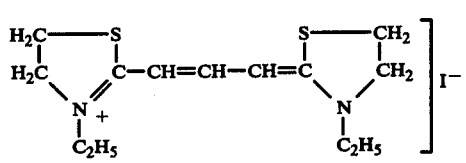
7. 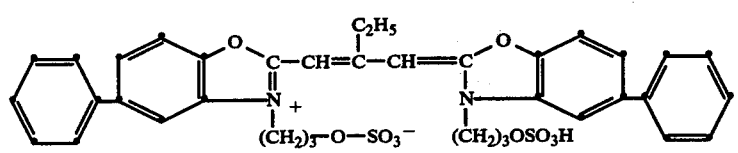
8. 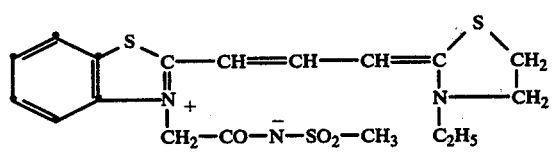
9. 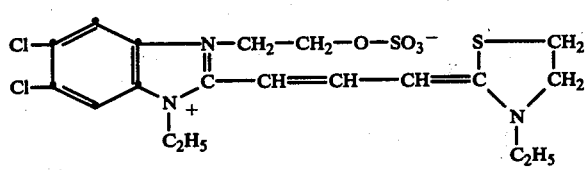
10. 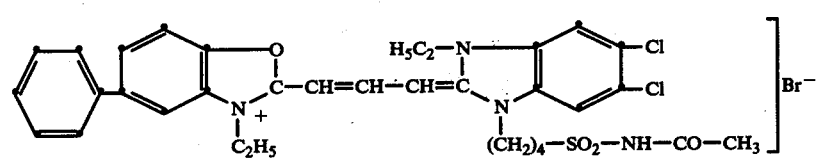
11. 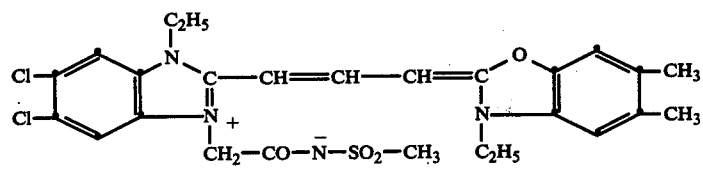
12. 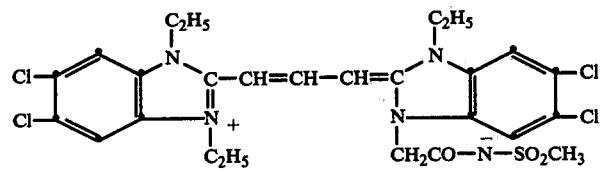

Table 2-continued
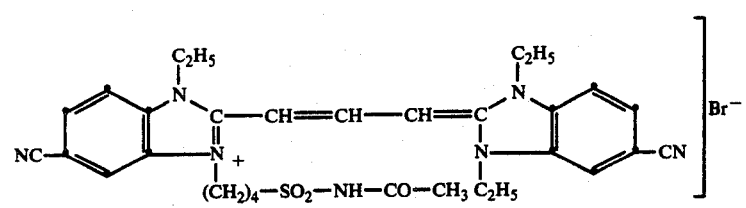 13.
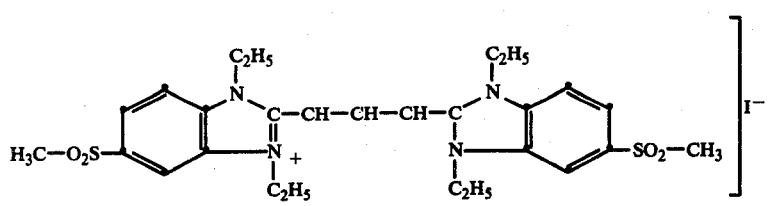 14.
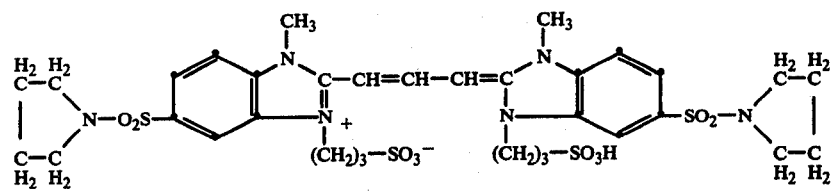 15.
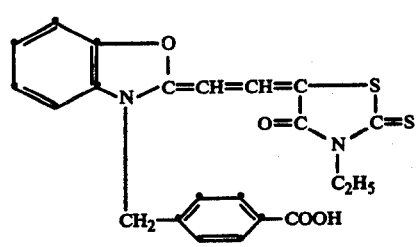 16.
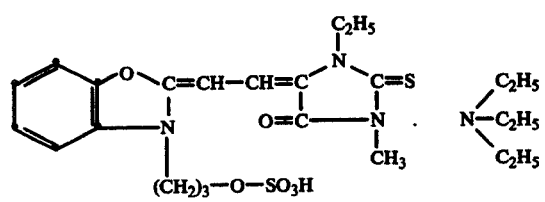 17.
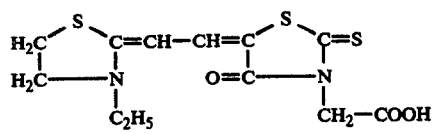 18.
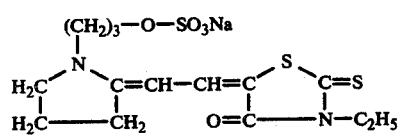 19.
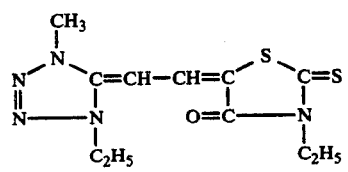 20.

Table 2-continued

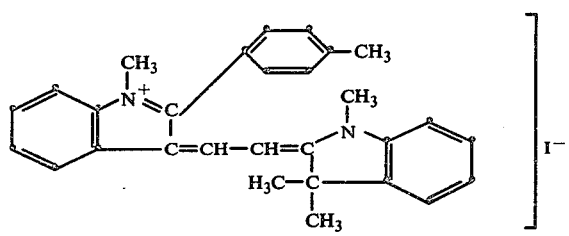

21.

Supersensitization in the green spectral range may be obtained with the following compounds 22 and 23 of Table 2 in a molar ratio 1:2.

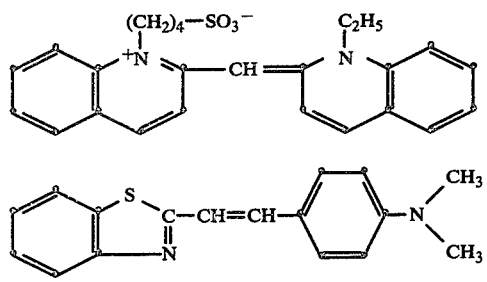

22.

23.

The silver halide in the emulsion layer(s) may comprise varying amounts of silver chloride, silver iodide, silver bromide, silver chlorobromide, silver bromoiodide, and the like, but when coated must be capable, after exposure and processing, of producing a negative silver image remaining thereon, i.e. in situ. Particularly good results are obtained with silver bromoiodide emulsions in which the average grain size of the silver bromoiodide crystals is in the range of about 0.1 to about 3 μm.

The image-forming silver halide emulsion may be chemically sensitized by any of the known procedures. The emulsions may be digested with naturally active gelatin or with small amounts of sulphur-containing compounds such as allyl thiocyanate, allylthiourea, sodium thiosulphate, etc. The image-forming emulsion may be sensitized likewise by means of reductors, e.g. tin compounds as described in the United Kingdom Patent Specification No. 789,823, polyamines e.g. diethyltriamine, and small amounts of noble metal compounds such as of gold, platinum, palladium, iridium, ruthenium, and rhodium as described by R. Koslowsky, Z. Wiss. Phot. 46, 67–72 (1951). Representative examples of noble metal compounds are ammonium chloropalladate, potassium chloroplatinate, potassium chloroaurate and potassium aurithiocyanate.

Emulsion stabilizers and antifoggants may be added to the silver halide emulsion before or after admixture of the low-speed emulsion, e.g., the known sulphinic and selenic acids or salts thereof, aliphatic, aromatic or heterocyclic mercapto compounds or disulphides, e.g. those described and claimed in published German Patent Application No. 2,100,622, preferably comprising sulpho groups or carboxyl groups, mercury compounds e.g. those described in Belgian Patent Specifications Nos. 524,121 — 677,337 — 707,386 and 709,195 and tetra-azaindenes as described by Birr in Z. Wiss. Phot. 47, 2–58 (1952), e.g. the hydroxy-tetraazaindenes of the following general formula:

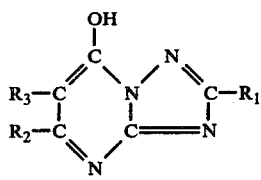

wherein:
each of $R_1$ and $R_2$ represents hydrogen, an alkyl, an aralkyl, or an aryl group, and
$R_3$ represents hydrogen, an alkyl, a carboxy, or an alkoxycarbonyl group, such as 5-methyl-7-hydroxy-s-triazolo[1,5-a]-pyrimidine.

Other additives may be present in one or more of the hydrophilic colloid layers of the radiation-sensitive silver halide elements of the present invention, e.g. hardening agents such as formaldehyde, dialdehydes, hydroxy aldehydes, mucochloric and mucobromic acid, acrolein, and glyoxal, mordanting agents for anionic colour couplers or dyes formed therefrom, plasticizers and coating aids e.g. saponin, e.g. dialkylsulphosuccinic acid salts such as sodium diisooctylsulphosuccinate, alkylaryl polyether sulphuric acids, alkylarylpolyethersulphonic acids, carboxyalkylated polyethyleneglycol ethers or esters as described in French Patent Specification No. 1,537,417 such as iso-$C_8H_{17}$—$C_6H_4$($OCH_2CH_2$)$_8OCH_2COONa$, fluorinated surfactants e.g. those described in Belgian Patent Specification No. 742,680 and the published German Patent Applications Nos. 1,950,121 and 1,942,665, inert particles such as silicon dioxide, glass, starch and polymethylmethyacrylate particles.

For the purpose of accelerating the development, the exposed photographic material is developed preferably in the presence of development accelerators. These development accelerators can be used either in the silver halide emulsion, in adjacent layer(s) or in the developing bath. They include alkylene oxide compounds of various types, e.g. alkylene oxide condensation products or polymers as described in U.S. Pat. Nos. 1,970,578 — 2,240,472 — 2,423,549 — 2,441,389 — 2,531,832 and 2,533,990 and in United Kingdom Patent Specifications Nos. 920,637 — 940,051 — 945,340 — 991,608 and 1,015,023. Other development accelerating compounds are onium and polyonium compounds preferably of the ammonium, phosphonium, and sulphonium type for example trialkyl sulphonium salts such as dimethyl-n-nonyl sulphonium p-toluene sulphonate, tetraalkyl ammonium salts such as dodecyl trimethyl ammonium p-toluene sulphonate, alkyl pyridinium and alkyl quinolinium salts such as 1-m-nitrobenzyl quinolinium chloride and 1-dodecylpyridinium chloride, bisalkylene pyridinium salts such as N,N'-tetramethylene bispyridinium chloride, quaternary ammonium and phosphonium polyoxyalkylene salts especially polyoxyalkylene bispyridinium salts, examples of which can be found in U.S. Pat. No. 2,944,900, etc.

After radiographic exposure the radiographic silver halide elements of the present invention are developed, preferably in an energetic surface developer. The high energy is required in order to allow the development to proceed quickly and may be obtained by properly alkalizing the developing liquid (pH 9–12), by using high-energy developing substances or a combination of developing substances, which as a consequence of their superadditive action is very energetic.

Economy on the silver halide in the emulsion is realized by building up the image density partly with dyes. Such may proceed by introducing (a) colour coupler(s) into the emulsion, which at least at the stage of the development form(s) (a) dye(s) with the oxidation product of an aromatic primary developing agent, e.g. of the p-phenylenediamine type, which dye(s) absorb(s) in the visible part of the spectrum.

Further it is known that a relatively high maximum density and contrast can be obtained even with a low amount of silver halide content per unit of surface when a colour image is produced together with a silver image as is described, e.g., in the published German Patent Application (D.O.S.) No. 1946652.

It is further known that fine-grained silver halide emulsions have a higher covering power than coarse-grained emulsions (ref. P. Glafkides, Photographic Chemistry, Vol. I (1958) 89–90).

By the term "covering power" is understood the reciprocal of the photographic equivalent of developed silver, i.e. the number of grams of silver per sq. decimeter divided by the maximum optical density.

Fine-grained emulsions have a lower photographic speed, however, and consequently the use of such types of emulsions requires an exposure that may surpass the permissible dose applied in medical X-ray photography. The low speed of said fine-grained emulsions having a high covering power e.g. at least 50, and low silver halide content i.e. equivalent to less than 80 mg of silver per sq.dm., e.g. 3 to 8 g of silver per sq.m., may be compensated by the use of fluorescent screens having a particularly high intensification factor.

When applying a colour development preferably so-called 2-equivalent couplers are used to further reduce the consumption of silver thus only 2 instead of 4 molecules of exposed silver halide are necessary for the production of 1 dye molecule. Such couplers contain in the coupling position, e.g. a halogen atom such as iodine, bromine, or chlorine (see therefor e.g. the U.S. Pat. No. 3,006,759). The density of the image is thus realised by addition of the densities of the silver image(s) combined with the dye image(s).

For improving the information content retrieval those phenol or α-naphthol type colour couplers are particularly suitable that on colour development of the silver halide with an aromatic primary amino developing agent form a quinoneimine dye mainly absorbing in the red and also absorbing in the green and having an absorption maximum in the spectral wavelength range of 550 to 700 (ref. therefor is made e.g. to the published German Patent Application D.O.S. No. P 1946652).

Phenol couplers suited for that purpose correspond, e.g., to the following general formula:

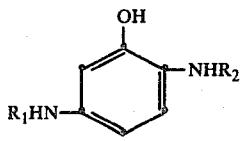

wherein: each of $R_1$ and $R_2$ represents a carboxylic acid acyl or sulphonic acid acyl group including said groups in substituted state, e.g. an aliphatic carboxylic acid acyl group, an aromatic carboxylic acid acyl group, an heterocyclic carboxylic acid acyl group, e.g. a 2-furoyl group or a 2-thienoyl group, an aliphatic sulphonic acid acyl group, an aromatic sulphonic acid acyl group, a sulphonyl thienyl group, an aryloxy-substituted aliphatic carboxylic acid acyl group, a phenyl carbamyl aliphatic carboxylic acid acyl group, or a tolyl carboxylic acid acyl group.

For such types of phenol colour couplers and their preparation reference may be made to U.S. Pat. Nos. 2,772,162 and 3,222,176, to United Kingdom Patent Specification No. 975,773.

When colour images are prepared together with silver images, use is made of aromatic primary amino colour developing agents e.g. N,N-dialkyl-p-phenylenediamines and derivatives thereof, e.g. N,N-diethyl-p-phenylenediamine, N-butyl-N-sulphobutyl-p-phenylenediamine, 2-amino-5-diethylaminotoluene hydrochloride, 4-amino-N-ethyl-N(β-methane sulphonamidoethyl)-m-toluidine sesquisulphate monohydrate and N-hydroxy-ethyl-N-ethyl-p-phenylenediamine. The colour developer can be used together with black-and-white developing agents e.g. 1-phenyl-3-pyrazolidinone and p-monomethylaminophenol which are known to have a superadditive effect on colour development (see L.F.A. Mason, J. Phot. Sci. 11 (1963) 136–139), and other p-aminophenol derivatives, e.g. those according to French Patent Specification No. 1,283,420 such as 3-methyl-4-hydroxy-N,N-diethylaniline, 3-methyl-4-hydroxy-N-ethyl-N-β-hydroxyethylaniline, 1-methyl-6-hydroxy-1,2,3,4-tetrahydroquinoline, 1-β-hydroxyethyl-6-hydroxy-1,2,3,4-tetrahydroquinoline, N-(4-hydroxy-3'-methylphenyl)-pyrrolidine, etc. It is also possible to use combinations of aromatic primary amino colour developing agents to obtain an increased rate of colour development (see e.g. German Patent Specification No. 954,311 and French Patent Specification No. 1,299,899); favourable effects are obtained e.g. by the use of N-ethyl-N-2-hydroxyethyl-p-phenylenediamine together with N-butyl-N-sulphobutyl-p-phenylenediamine, 2-amino-5-diethylamino-toluene hydrochloride or N,N-diethyl-p-phenylenediamine hydrochloride.

The developing solutions may also comprise any of the usual additional ingredients e.g. sodium sulphite and hydroxylamine or derivatives thereof, hardening agents, antifoggants e.g. benzotriazole, 5-nitro-benzimidazole, 5-nitro-indazole, halides such as potassium bromide, silver halide solvents, toning and intensifying compounds, solvents e.g. dimethylformamide, dimethylacetamide and N-methyl-pyrrolidone for chemical ingredients that are difficult to dissolve in the preparation of the developing solutions or that tend to precipitate upon standing, etc.

The radiation-sensitive emulsions for use in the present invention may be coated on a wide variety of supports e.g. films of cellulose nitrate, cellulose esters, polyvinylacetal, polystyrene, polyethylene terephthalate and other polyester materials as well as α-olefin-coated papers e.g. paper coated with polyethylene or polypropylene.

Preferred supports comprise a linear condensation polymer, polyethylene terephthalate being an example thereof.

The supports used in the present recording materials may be coated with subbing layers for improving the adhesion of (a) gelatino-silver halide emulsion layer(s) thereto. As already mentioned the support may be coloured. According to the present invention blue dyes are preferred. Blue polyester resin supports are known from the prior art.

The mechanical strength of melt-extruded supports of the polyester type can be improved by stretching. In some cases as described in the United Kingdom Patent Application No. 1,234,755 the support may carry a subbing layer in the stretching stage.

Suited subbing layers are known to those skilled in the art of silver halide photography. With regard to the use of hydrophobic film supports reference is made to the composition of subbing layers described in the United Kingdom Patent Specification No. 1,234,755.

According to said specification a hydrophobic film support has (1) a layer which is directly adherent to the said hydrophobic film support and comprises a copolymer formed from 45 to 99.5% by weight of at least one of the chlorine-containing monomers vinylidene chloride and vinyl chloride, from 0.5 to 10% by weight of at least an ethylenically unsaturated hydrophilic monomer, and from 0 to 54.5% by weight of at least one other copolymerisable ethylenically unsaturated monomer; and (2) a layer comprising in a ratio of 1:3 to 1:0.5 by weight a mixture of gelatin and a copolymer of 30 to 70% by weight of butadiene with at least one copolymerisable ethylenically unsaturated monomer.

The exposed radiographic elements of the present invention are preferably processed in an automatic processing apparatus for X-ray films in which the photographic material may be guided automatically and at a constant speed from one processing unit to the other, but it will be understood by those skilled in the art that the radiographic image recording elements disclosed herein can also be processed apart from the above mentioned automatic processing apparatus in a variety of ways, such as by using the manual conventional multi-tank methods well known in the art.

For common emulsion preparation processes and the use of particular emulsion ingredients reference is made in general to the Product Licensing Index of December 1971 in which the following terms are dealt with in more details:

I/II — Emulsion type and preparation of said element
III — Chemical sensitization
IV — Development modifiers
V — Antifoggants and stabilizers
VI — Developing agents
VII — Hardeners
VIII — Binding agents or polymers for silver halide layers and other layers
IX — Antistatic layers
X — Supports
XI — Plasticizers and lubricants
XII — Coating aids
XV — Spectral sensitization agents for silver halides
XXIII — Colour material ingredients
XVI — Absorbing and filter dyes
XXI — Physical development systems, and
XVII and XVIII — Addition agents and coating procedures.

The following example illustrates the present invention.

EXAMPLE

Preparation of the light-sensitive silver halide materials used in a comparative test as described hereinafter.

Light-sensitive materials A and B

A silver bromoiodide X-ray emulsion (2 mole % of silver iodide) was prepared in such a way that it contained silver halide grains with an average grain size of 1.25 μm and comprised per kg an amount of silver halide corresponding to 190 g of silver nitrate and 74 g of gelatin. As stabilizing agents the emulsion contained per kg 545 mg of 5-methyl-7-hydroxy-s-triazolo[1,5-a]pyrimidine, 6.5 mg of 1-phenyl-5-mercaptotetrazole, and 0.45 mg of mercury cyanide.

The above emulsion was coated on both sides of a double side subbed polyethylene terephthalate support in such a way that on each side of the support a silver halide emulsion layer was obtained containing an amount of silver halide equivalent to 7 g of silver nitrate per sq.m.

Each emulsion layer was coated with a gelatino anti-stress layer at a coverage of 1 g/sq.m.

Light-sensitive material C

A silver bromoiodide X-ray emulsion (2 mole % of silver iodide) was prepared in such a way that it contained silver halide grains with an average grain size of 1.25 μm and comprised per kg an amount of silver halide corresponding to 190 g of silver nitrate and 74 g of gelatin.

The obtained silver halide emulsion was spectrally sensitized for light in the wavelength range of 480–600 nm with 150 mg per kg emulsion of a spectral sensitizing dye corresponding to the following structural formula:

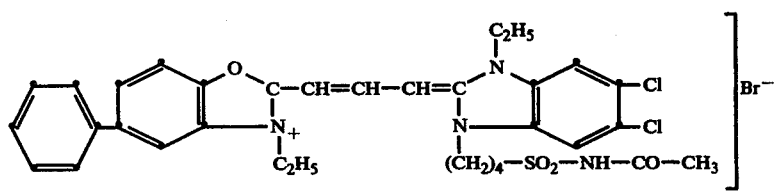

As stabilizing agents the emulsion contained per kg 545 mg of 5-methyl-7-hydroxy-s-triazolo[1,5-a]pyrimidine, 6.5 mg of 1-phenyl-5-mercaptotetrazole, and 0.45 mg of mercury cyanide.

The above emulsion was coated on both sides of a double side subbed polyethylene terephthalte support in such a way that on each side of the support a silver halide emulsion layer was obtained containing an amount of silver halide equivalent to 7 g of silver nitrate per sq.m.

Each emulsion layer was coated with a gelatino antistress layer at a coverage of 1 g/sq.m.

Light-sensitive material D

A silver bromoiodide X-ray emulsion (2 mole % of silver iodide) was prepared in such a way that it contained silver halide grains with an average grain size of 1.25 μm and comprised per kg an amount of silver halide corresponding to 190 g of silver nitrate and 74 g of gelatin.

The obtained silver halide emulsion was spectrally sensitized for light in the wavelength range of 480–600 nm with 150 mg per kg of emulsion of a spectral sensitizing dye corresponding to the following structural formula:

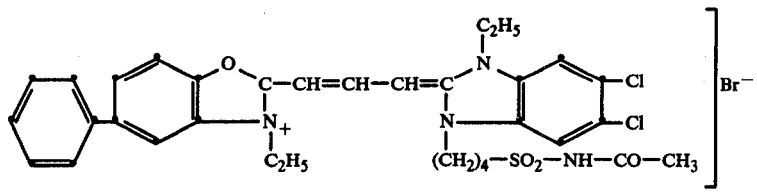

As stabilizing agents the emulsion contained per kg 545 mg of 5-methyl-7-hydroxy-s-triazolo[1,5-a]pyrimidine, 6.5 mg of 1-phenyl-5-mercaptotetrazole, and 0.45 mg of mercury cyanide.

Finally the following filtering dyes were added per kg of emulsion:

800 mg of

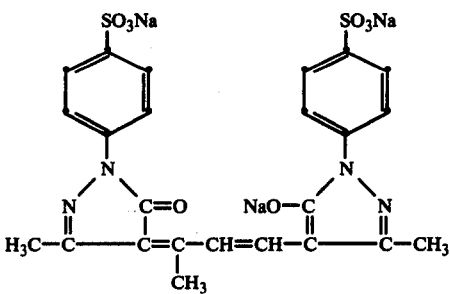

and
700 mg of

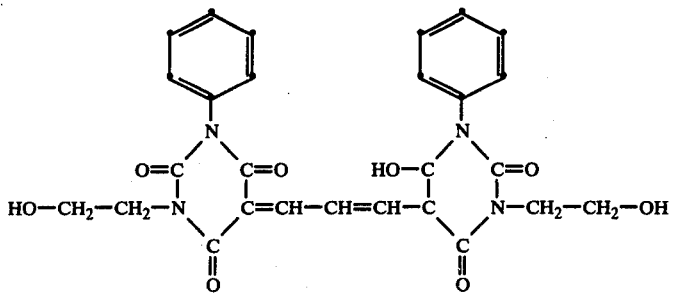

The above emulsion was coated on both sides of a double side subbed polyethylene terephthalate support in such a way that on each side of the support a silver halide emulsion layer was obtained containing an amount of silver halide equivalent to 7 g of silver nitrate per sq.m.

Each emulsion layer was coated with a gelatino antistress layer at a coverage of 1 g/sq.m.

Composition of the fluorescent screen material I

The fluorescent screen is composed of a fluorescent layer applied onto a polyethylene terephthalate resin support having a thickness of 250 μm.

The fluorescent layer contains $CaWO_4$-particles dispersed in a binder. The fluorescent layer is applied onto a reflective intermediate coating containing titanium dioxide particles for obtaining a higher light output of the screen.

The $CaWO_4$-particles have an average grain size of 6 microns and are applied at a coverage of 410 g per sq.m. The thickness of the fluorescent screen is 170 μm.

The fluorescent layer is covered with a resin type anti-stress layer of 15 μm.

Composition of the fluorescent screen material II

The fluorescent screen is composed of a fluorescent layer applied onto a polyethylene terephthalate resin support having a thickness of 250 μm.

The fluorescent layer contains in a ratio of 75:25 by weight a mixture of $Gd_2O_2S$ activated with 0.3% of terbium and $Y_2O_2S$ activated with 0.3% of terbium dispersed in a binder. The fluorescent layer is applied to an anti-halation layer containing 5 mg per sq.m of the dye NEOZAPON FIRE RED (C.I. Solvent Red 119) in a binder adhering to the polyester.

The fluorescent particles have an average grain size of 10 microns and are applied at a coverage of 390 grams per sq.m. The thickness of the fluorescent screen is 101 μm.

The fluorescent layer is covered with a resin type anti-stress layer of 15 μm.

EXPOSURE

The light-sensitive materials A, B, C and D were exposed with a 80 kV X-ray radiation filtered through a 6 mm aluminum sheet and modulated with a test object being a line screen made of lead wherein the width of the bars of the screen gradually diminishes, and their spatial frequency (number per mm) gradually increases from one side of the test object to the other. By applying such a test object in the exposure it is possible to obtain an objective value for the resolving power independently of subject contrast by determining the "square wave response function" (SWRF) (ref. Amer. Journal of Roentgenol. 106 (1969) pages 650-654.

The light-sensitive material A was exposed between two fluorescent screen materials I arranged in contact with the opposite sides of the light-sensitive material.

The light-sensitive materials B, C and D were exposed in the same conditions as material A but between two screen materials II that are arranged in contact with the opposite sides of the light-sensitive material.

The exposed materials were processed in an automatic 90 seconds processing machine the development occurring for 23 seconds at 35° C. in Agfa-Gevaert's hardening developer G 138 containing hydroquinone and 1-phenyl-3-pyrazolidinone as developing agents and glutaraldehyde as hardener.

The square wave response function of the test materials was derived from the measurements obtained by scanning the line pattern obtained in these materials with a microdensitometer.

The relative square wave response factor at a special frequency of one line pair per millimeter for the different combinations of light-sensitive materials and screens as defined above is listed in the following Table.

TABLE

| Combination of light-sensitive material and screen | Relative Speed | Relative square wave response factor |
|---|---|---|
| A, I | 100 | 0.60 |
| B, II | 100 | 0.74 |
| C, II | 225 | 0.75 |
| D, II | 125 | 0.80 |

I claim:
1. A combination of photosensitive materials suited for radiography comprising:
  (1) at least one X-ray fluorescent screen material having more than half its spectral emission above about 410 nm and having its emission maximum in the wavelength range of 480 to 600 nm and having a coverage of 250 to 600 g per sq.m of fluorescent substance(s) in a fluorescent layer having a thickness in the range of 70 to 250 microns, the intensification factor of the screen being at least 20 at 40 kV and at least 25 at 80 kV, said screen material containing a dye or a pigment or a mixture of dyes and/or pigments absorbing light within the emission spectrum of the fluorescent substance(s);
  (2) a photosensitive silver halide recording material which comprises a support and incorporates at least one silver halide emulsion layer and wherein the combined absorption of the support and of the layers at one side of the support is such that (i) the light absorption spectrum thereof mainly (at least for 50%) corresponds with the light emission spectrum of the fluorescent screen material in the wavelength range of 360 to 600 nm and (ii) the said combined absorption is such that in the range of overlap of said absorption and emission spectrum the optical density resulting therefrom comprises values in the range of 0.6 to 1.3 due to the inherent absorption of the silver halide emulsion layer(s) and the presence of (a) colouring substance(s) in one or more layers of the recording material including the support and the silver halide emulsion layer(s) in which silver halide grains are present that have been spectrally sensitized for visible light situated in the wavelength range of 480 to 600 nm.

2. The combination of claim 1, in which said screen contains fluorescent substances comprising elements with atomic number 39 or 57 to 71.

3. The combination of claim 2, in which said fluorescent substance is a rare earth oxysulphide or oxyhalide activated with other rare earth elements.

4. The combination of claim 3, in which said fluorescent substance is a lanthanum or gadolinium oxybromide or oxychloride activated with terbium or dysprosium or is a lanthanum or gadolinium oxysulphide activated with terbium and/or dysprosium.

5. The combination of claim 1, wherein the fluorescent screen contains a fluorescent substance corresponding to the following general formula:

$M_{(w-n)}M'_nO_wX$ wherein:
  M is at least one of the metals yttrium, lanthanum, gadolinium or lutetium,
  M' is at least one of the rare earth metals dysprosium, erbium, europium, holmium, neodymium, praseodymium, samarium, terbium, thulium or ytterbium,
  X is sulphur or halogen,
  n is 0.0002 to 0.2, and
  w is 1 when X is halogen or is 2 when X is sulphur.

6. The combination of claim 5, wherein the screen comprises a terbium-activated gadolinium or lanthanum oxysulphide having emission peaks at 490 and 540 nm.

7. The combination of claim 1, in which the fluorescent screen contains a mixture of:
  (A) yttrium oxysulphide activated with from 0.1 to 10% by weight of terbium or activated with terbium and dysprosium, and
  (B) gadolinium or lanthanum or lutetium oxysulphide activated with terbium or dysprosium.

8. The combination according to claim 1, wherein the intensifying screen contains fluorescent particles dispersed in a binder within the range of 85-95% by weight.

9. A combination according to claim 1, wherein the intensifying screen contains fluorescent particles having a grain size within the range of about 1-25μ.

10. A combination according to claim 1, wherein said silver halide grains are coated on both sides of the support.

11. A combination according to claim 1, wherein the silver halide has been sensitized with (a) spectral sensitizing dye(s) of the class of cyanine or merocyanine dyes.

12. A combination according to claim 1, wherein the silver halide is a silver bromoiodide having an average grain size in the range of about 0.1 to 5μ.

13. The combination according to claim 1, wherein the silver halide emulsion layer(s) contain(s) a colour coupler for forming a dye with an oxidized p-phenylenediamine developing agent.

14. The combination described in claim 13, wherein the colour coupler is a phenol or a α-naphthol colour coupler that on colour development of the silver halide with an aromatic primary amino developing agent forms a quinoneimine dye mainly absorbing in the red and partly absorbing in the green and having an absorption maximum in the spectral wavelength range of 550 to 700 nm.

15. The combination described in claim 14, wherein the colour coupler is a phenol, which corresponds to the following general formula:

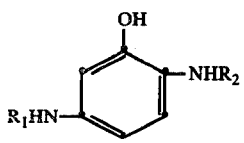

wherein:
each of $R_1$ and $R_2$ represents a carboxylic acid acyl or sulphonic acid acyl group including said groups in substituted state, e.g. an aliphatic carboxylic acid acyl group, an aromatic carboxylic acid acyl group, an heterocyclic carboxylic acid acyl group, e.g. a 2-furoyl group or a 2-thienoyl group, an aliphatic sulphonic acid acyl group, an aromatic sulphonic acid acyl group, a sulphonyl thienyl group, an aryloxy-substituted aliphatic carboxylic acid acyl group, a phenylcarbamyl aliphatic carboxylic acid acyl group, or a tolyl carboxylic acid acyl group.

16. The combination described in claim 1, wherein the photosensitive silver halide material contains an amount of silver halide equivalent to about 3 to 8 g silver per sq.m.

17. The combination of claim 1, wherein the photosensitive material on both sides of its support has been coated with a silver halide emulsion layer and between said silver halide emulsion layers and/or in said emulsion layers (a) filtering dye(s) is (are) present that can be decolourized in one of the processing baths for the photosensitive silver halide material.

18. The combination of claim 1, wherein said colouring substances are filtering dyes having a chemical structure as exemplified in Table 1 hereinbefore in the description.

19. The combination of claim 1, wherein the photosensitive silver halide recording material contains a support having a blue colour.

20. The combination of claim 1, wherein the photosensitive silver halide recording material contains as colouring substances a filtering dye or mixture of filtering dyes that absorbs in the wavelength range of 480 to 600 nm.

21. The combination of claim 20, wherein said filtering dyes are used in a hydrophilic colloid layer.

22. The combination of claim 1, wherein the fluorescent screen is in the form of a layer applied to a support or applied as a self-supporting layer or sheet.

23. The combination of claim 22, wherein the fluorescent screen contains fluorescent substances dispersed in a binder.

24. The combination of claim 1, wherein the fluorescent screen is arranged separately from the photosensitive material containing the silver halide.

25. The combination of claim 1, wherein the fluorescent screen forms an integral arrangement with the photosensitive material containing the silver halide.

26. The combination of claim 1, wherein the dye(s) and/or pigment(s) of the screen material is (are) present in the layer containing the fluorescent substance(s).

27. The combination of claim 1, wherein the dye(s) and/or pigment(s) is (are) present in a layer adjacent to the layer containing the fluorescent substance(s).

28. The combination of claim 1, wherein the dye(s) and/or pigment(s) is (are) present in an antihalation layer subjacent to the fluorescent layer.

29. The combination of claim 1, wherein the dye in the screen material is Neozapon Fire Red (C.I. Solvent Red 119).

30. A combination according to claim 1, wherein the dye(s) and/or pigment(s) in the screen material is (are) present in an antihalation layer of the screen material in an amount of at least 0.5 mg per sq.m.

* * * * *